SPACE CRAFT REENTRY BLACKOUT RECORDER

Filed Sept. 8, 1967 2 Sheets-Sheet 1

INVENTORS.
GEORGES M. CNUDDE and
ROBERT O. HUTCHINSON
BY
H. W. Losche
Attorney

SPACE CRAFT REENTRY BLACKOUT RECORDER

Filed Sept. 8, 1967 2 Sheets-Sheet 2

INVENTORS.
GEORGES M. CNUDDE and
BY ROBERT O. HUTCHINSON
H. H. Losche
Attorney

United States Patent Office 3,508,230
Patented Apr. 21, 1970

3,508,230

SPACE CRAFT REENTRY BLACKOUT RECORDER

Georges M. Cnudde, Menlo Park, and Robert O. Hutchinson, Mountain View, Calif., assignors to Lockheed Missiles & Space Company, Sunnyvale, Calif., a corporation of California Filed Sept. 8, 1967, Ser. No. 667,328
Int. Cl. G11b *5/00;* G08c *15/06;* G04b *7/00*
U.S. Cl. 340—174.1 7 Claims

ABSTRACT OF THE DISCLOSURE

A space reentry blackout recorder transmitting system having a tape recorder with erase and recording heads and a playback head with a tape magazine between the recording head and playback head to produce playback delay for the amount of time taken by the tape in passing in and out of the tape magazine. The information signals, time-shared by a commutator, are modulated by a low frequency operating gating means for recording which, after being played back for radio link transmission, are reshaped and filtered in the transmission circuits to reproduce the information signals accurately. The same oscillator that produces the low frequency is used to supply a reference frequency that is played back to control tape speed.

Background of the invention

This invention relates to data transmission systems for transmitting data picked up by a spacecraft or missile for transmission to a ground station by a telemetering radio link.

Telemetering systems for transmitting data of atmospheric or space conditions from a flying object or missile back to ground are used extensively. Some of those systems utilize a tape recorder along with a real-time transmission system to make a record that may be played back later, after return of the object or missile to the ground, for further study and evaluation. A tape recorder is used in some known systems to record and to transmit the data directly from a playback of the tape recorder. Based on past experience it is a well-known fact that radio frequency (RF) radiation from instrumented space vehicles is severely attenuated during reentry to the point that transmission to the ground becomes impossible for periods of time. The data gathered, such as, temperature, pressure, acceleration, etc., by the instrumentation system during such periods is usually vital to the flight objectives. Hence, some of the vital information which should be transmitted to the ground station is lost by reason of the missile passing through the "black-out" layer or region in the earth's atmosphere.

Summary of the invention

In the present invention a telemetering tape recording system is provided in which the tape recorder incorporates a tape magazine between the recording head and the playback head to cause a delay in the transmission to ground from the playback head by an amount of the magnetic tape in the tape magazine. The amount of this tape in the tape magazine can be regulated to cause a three to ten second delay sufficient to allow the air vehicle or missile to pass through the "black-out" region. Accordingly, atmospheric or space data picked up by the tape recorded is not lost by the "black-out" region but is transmitted three to ten seconds later. This system used in conjunction with a real-time telemetering system provides a complete transmission of all data to the ground station. The system of this invention is improved over prior known systems in that the data signals, being direct current (D.C.) amplitude signals, are commutated through a sampling switch or commutator driven by the same motor that drives the capstan of the tape recorder. The data signals are chopped by a predetermined frequency providing a carrier for the signals and this same frequency is used as a reference frequency which is recorded on a second track of the tape and played back through a feedback circuit to control the commutator motor speed and thus the capstan and tape speed. Control of the motor speed minimizes flutter in the data signals recorded and played back. It is accordingly an object of this invention to provide a telemetering data transmission system utilizing a loop magnetic tape double track recorder to transmit data signals after a predetermined delay in conjunction with a real-time transmission system to avoid loss of any data signals of the air vehicle or missile carrying the systems to "black-out" in passing through a high attenuation region in the atmosphere.

Brief description of the drawing

These and other objects and the attendant advantages, features, and uses of the invention will become more apparent to those skilled in the art as a more detailed description proceeds when considered along with the accompanying drawing, in which.

Description of the preferred embodiment

Figure 1:
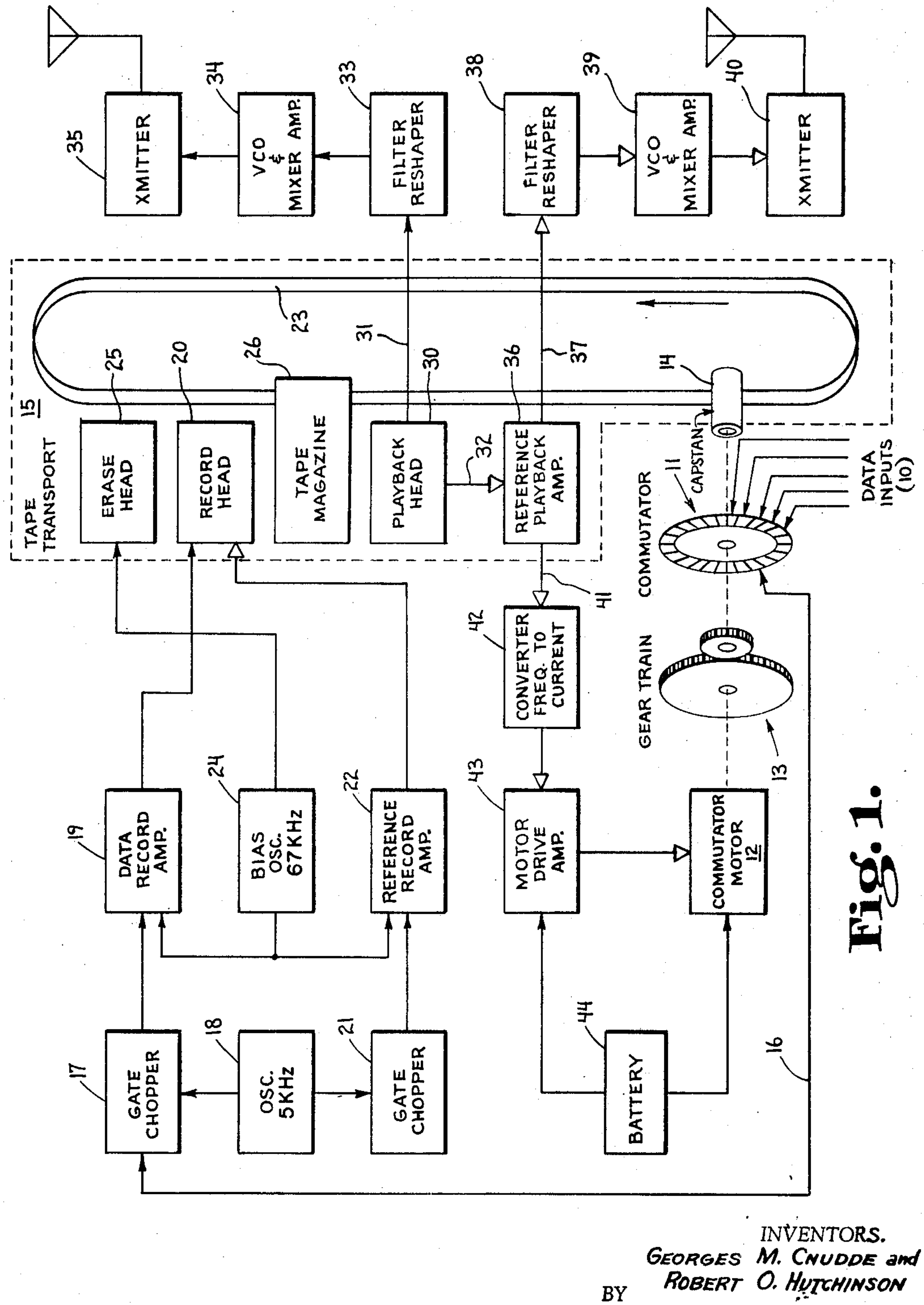
FIGURE 1 is a block circuit schematic of the tape recorder telemetering system of this invention.

Referring more particularly to FIGURE 1 there is illustrated a part of a telemetering system carried in a space or missile vehicle for transmitting information data signals to a ground station. Data, such as pressure, temperature, acceleration, voltage standing wave ratio, etc., from sensors (not shown) are applied by leads 10 to a sampling switch or commutator 11 driven by a commutator motor 12 through a gear train 13. Motor 12 also drives a capstan 14 in a tape transport 15.

The data inputs 10 are D.C. voltage signals that provide information in accordance with their amplitudes. These data signals are conducted in sequence over the conductor 16 to a gating or chopper circuit 17 driven by an oscillator 18 which oscillates at a 5 thousand (K) Hertzian (Hz.) rate, this rate being preferred as will be explained later. The chopped signals are amplified in a data record amplifier 19 and applied to the record head 20 of the tape transport 15. The oscillator 18 also applies its oscillations through a gate-chopper circuit 21 and a reference record amplifier 22 to the record head 20, the record head 20 being double to record data signals on one track and the reference signals on the other track of a two-track magnetic loop tape 23. Each amplifier 19 and 22 is biased from a biasing oscillator 24 which oscillates preferably at 67 kHz. It is also well known that the 67 kHz. oscillations are good for erasing the magnetic tape and consequently the output of 24 is applied to an erasing head 25 preceding the record head 20 in the travel of the tape 23. Accordingly, signals remaining on the loop tape 23 are erased for new signals to be placed thereon by the record head 20.

A playback head 30 picks up the signals from the tape 23 and conducts the data signals over the output 31 to a filter-reshaper circuit 33 and the reference signal over output 32 to a reference playback amplifier 36. The filter-reshaper circuit 33 output is coupled to a variable controlled oscillator and mixer amplifier circuit 34, the output of which is coupled to a transmitter 35 to transmit the data signals to a ground station. In like manner the reference playback amplifier 36 has one output 37 coupled through a filter-reshaper circuit 38 to a variable controlled oscillator and mixer amplifier circuit 39 which in turn is coupled to a transmitter 40 for transmitting the reference frequency to the ground station.

The playback of the data signals and the reference signals is delayed by virtue of the tape passing through a tape magazine 26 between the record head 20 and the playback head 30. The tape is made to loop in convolutions within the tape magazine 26 for a length to produce the desired time delay, for example for three to ten seconds.

The reference playback amplifier 36 has a second output 41 coupled through a frequency-to-current converter 42 to a motor drive amplifier 43. The commutator motor 12 is powered from a source shown as a battery 44, although other power sources may be used as desired, and this power source is controlled by the motor drive amplifier 43 to control the speed of the commutator motor 12. Since the commutator motor 12 also drives the capstan 14, the tape speed will be controlled in accordance with the reference oscillations played back from the playback head 30. It is to be noted that the data signals may be traced by the black arrowheads in FIGURE 1 while the reference frequency may be traced by the white arrowheads.

The signal recovered from magnetic tape in playback is not a stable reproduction of the recording signal with respect to amplitude, nor is wave shape particularly preserved. For this reason, in order to reduce these shortcomings, the feedback servo loop utilizing the reference frequency of 5 kHz. from the playback head 30 are applied to the converter 42 to convert this frequency to a current. If the frequency played back is above the 5 kHz., the current will be operative to reduce the speed of the motor 12, and vice versa. This will correct tape speed variations as "felt" by the playback head. This will compensate, bp data reduction comparison, for variations at lower frequencies than the commutation rate. This will correct such things as temperature drift effects in the electrons, power supply voltage shift due to batery degeneration, and any of the many variables that cause a low speed but discrete shift in the absolute parameter as replayed into the variable controlled oscillator 34. This includes the chopper 17, the oscillator 18, the record and playback amplifiers 19 and 36, and the interconnecting and ground effects of the system in general. It will not correct high speed tape flutter. It is for this reason that the motor servo reference frequency signal is transmitted over a separate channel to the ground station, and in this manner enable the data reduction group to adjust the data as the reference level changes relative to the stable 5 kHz. signal.

Figure 2:
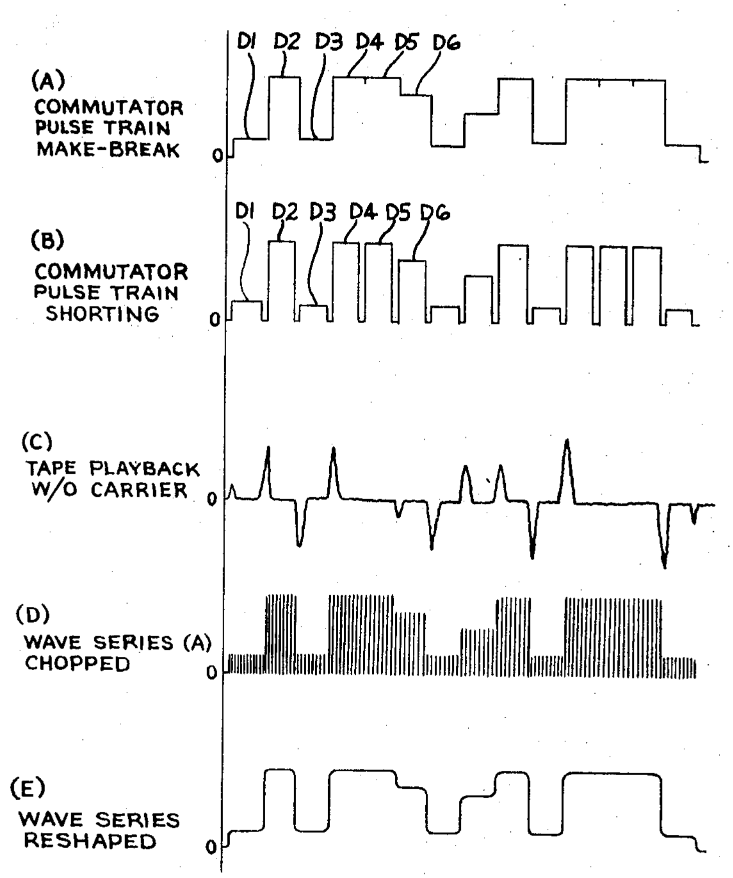
FIGURE 2 illustrates several waveforms produced in the circuit of FIGURE 1 with the exception of waveform *c*.

Referring more particularly to FIGURE 2, line A shows a commutated pulse train of a make-before-break type of commutator signals D1, D2, D3, etc. Line B illustrates these same signals from a shorting type commutator in which the waveform returns to zero after each data signal. Both the make-brake and shorting types of commutators are well known and the present invention will operate equally well with either type of data signals. Line C illustrates the type of tape playback from known recorders in which the data signals are differentiated and the reproduced data signals are derived from these differentiated signals. Line D illustrates the type of wave produced from line A or B on the output of the gate chopper 17 providing a carrier for the data signals. The chopped or gated data signals make it possible to amplify the low-level signals in the record amplifier 19 as alternating current. Choosing a data rate of 300 pulses per second the number of chopping cycles is as follows:

$$\frac{\text{Chopping rate } 5000\,\frac{\text{cycles}}{\text{second}}}{\text{Data rate } 300\,\frac{\text{pulses}}{\text{second}}}=16.66 \text{ or } 17\,\frac{\text{cycles}}{\text{pulse}}$$

Thus, the amplitude of each data signal is reproduced 17 times, thereby averaging errors due to flutter and variation in the tape oxide. The use of carrier techniques permits the use of a high pass filter at the record amplifier input to eliminate transient interference, and permits tuning the ampliler and tape system to a single ideal frequency. The carrier technique provides an abvious solution to the problem of D.C. drift and low frequency signal response.

The tape transport 15 chosen has a tape speed of 2.95 inches per second. When this is compared with state-of-the-art acceptance of 1666 cycles per linear inch of tape, a response capability is obtained of:

$$f_r=(1666)\,\frac{\text{cycles}}{\text{inch}}\,(2.95)\,\frac{\text{inches}}{\text{second}}=\text{frequency response}$$

$$f_r=4915\,\frac{\text{cycles}}{\text{second}} \text{ or } \simeq 5kHz.$$

used as the most desirable chopping frequency.

The delay time variation available is a measure of the minimum and maximum tape loop the transport 15 will handle. This is about 5.5 to 25 inches.

Where:

T=tape speed (inches/second)
L=tape length (inches)
$t$=Time delay (seconds)
$t=L/T$ $$t_{min}=\frac{5.5}{2.95}=1.87 \text{ seconds}$$

$$t_{max}=\frac{25}{2.95}=8.48 \text{ seconds}$$

These maximum and minimum time delays can be produced by storage of tape in the tape magazine 26 and the delayed data signals D will be reshaped as shown in line E, FIGURE 2, in the filter reshaper circuit 33. The reshaped voltage data signals E are applied to the variable controlled oscillator and mixer amplifier 34 for transmission over the transmitter, as is well understood by those skilled in the art.

Operation

In the operation of the system shown in FIGURE 1, with occasional reference to FIGURE 2, let it be assumed that amplitude voltage data signals from sensors (not shown) of temperature, pressure, acceleration, etc., are applied to the data inputs 10 and that this system is carried by a missile or space craft capable of reentry back to earth. These data signals are commutated by the commutator or sampling switch 11 to conduct these data signals in sequence to the gate chopper circuit 17 in a manner shown by the line A or B in FIGURE 2. The output of the gate chopper 17 produces the data signals as shown in line D of FIGURE 2, the 5 kHz. chopping frequency providing a carrier for the D.C. data signals. The chopped wave series D is amplified in the data record amplifier 19 under the bias of the oscillations from the bias oscillator 24. These bias oscillations are also used to energize the erase head 25 to erase both tracks of the tape 23 prior to recording the amplified data signals of line D on one of the tape tracks. The 5 kHz. oscillator 18 also has its frequency chopped in 21 and biased from the oscillations of the bias oscillator 24 in the reference record amplifier 22, this chopped frequency being recorded on the other track of the tape 23 by the record head 20. The loop tape 23 is driven in a counterclockwise direction by the capstan 14, as shown by the arrow. The tape 23 enters the tape magazine 26 when it is made to pass over several loops to extend its path length and thus delay the time after record to pass the recorded bits through the playback head 30. Playback from one track is conducted by the conductor 31 to the filter reshaper circuit 33 to filter out the 5 kHz. frequency and to reshape the data signal sequence into the form illustrated by the line E of FIGURE 2. Playback from the other track is the reference frequency over the output 32 to the reference playback amplifier 36, thence over output 37 to the filter-reshaper circuit 38. The data signals are transmitted by the transmitter 35 and the reference frequency is transmitted by the transmitter 40. The transmission to the ground station of this reference frequency enables ground personnel to evaluate the flutter error of the data signal information received and to make correction therefor.

The reference playback amplifier 36 also applies the reference frequency by way of conductor 41 through the frequency-to-current converter 42 to the drive motor amplifier to control the speed of the commutator motor 12 and thus the capstan 14 and tape 23 speed. This control is operative to stabilize the tape 23 speed and thus minimize flutter by virtue of the playback head seeing any plus or minus variation from the 5 kHz. reference signal. The motor drive amplifier 43 will then have direct current added or subtracted from the battery 44 current to correct the speed of motor 12 which, in this system is a D.C. permanent magnet motor. Thus, the data signals are transmitted to the ground station with the minimum of flutter for use by ground personnel to signal back maneuvers to the missile. Since the transmitted signals are delayed, any data signals acquired by the missile while reentering through a highly attenuated region in the atmosphere will be transmitted seconds later and are not "blacked-out" or lost. Data signals stored on the tape preceding the "black-out" region would normally be transmitted in the "black-out" region are transmitted by a real-time transmitter used in conjunction with the present delay transmitter thereby providing full, unbroken data signal information to the ground station.

While many modifications and changes may be made in the constructional details and features of this invention to still carry out the spirit and scope of the inventive concept, it is to be understood that we desire to be limited in our invention only by the scope of the appended claims.

We claim:

1. A space flying vehicle data recording and delayed transmitting system comprising:

a tape transport having a capstan for driving a two-track, loop magnetic tape over an erase head, a double record head, and a playback head;

a tape magazine on the transport between the record head and the playback head for accommodating a length of tape travel therethrough after recording thereon and before playback therefrom to produce a predetermined delay in playback;

a commutator having a plurality of electrical data signal inputs coupled for consecutive switching to an output when the commutator is rotated;

motive means coupled to rotate said capstan and said commutator, said motive means being powered through a speed control driver amplifier;

means in said commutator output for producing a carrier frequency on said electrical data signals and applying them to one of said double recording heads and applying said carrier frequency over the other of said double recording heads to produce an electrical data signal track and a reference frequency track on said tape;

means coupled to said erase head to erase tape signals preceding the recording of said data and reference frequency signals;

means coupled to said playback head to transmit said electrical data signals and said reference frequency signals; and means coupled to said playback head playing back said reference frequency to convert said frequency above and below a predetermined frequency into an electrical current, said electrical current being applied to said speed control driver amplifier to stabilize the speed of said motive means whereby voltage amplitude data information signals are transmitted in sequence to a ground station after a predetermined delay along with said reference frequency from a magnetic tape on which said information signals are recorded.

2. A space flying vehicle data recording and delayed transmitting system as set forth in claim 1 wherein said means in said commutator output for producing a carrier frequency include an oscillator, a pair of gate-chopper circuits, a data record amplifier, and a reference record amplifier, with said oscillator coupled to each gate-chopper circuit, the commutator output coupled through one of said gate-chopper circuits and said data record amplifier to said one of said double record heads, and the other of said gate-chopper circuits being coupled through said reference record amplifier to said other of said double record heads.

3. A space flying vehicle data recording and delayed transmitting system as set forth in claim 2 wherein said means coupled to said erase head is a high frequency bias oscillator coupled to each data record amplifier and reference record amplifier to bias these amplifiers and to provide continuous erasure of the magnetic tape.

4. A space flying vehicle data recording and delayed transmitting system as set forth in claim 3 wherein said means coupled to said playback head to transmit said electrical data signals and said reference frequency signals are a filter and reshaper circuit, a variable controlled oscillator and mixer amplifier, and a transmitter in series from the playback head playing back the track of the tape storing said electrical data signals, and a filter and reshaper circuit, a variable controlled oscillator and mixer amplifier, and a transmitter in series from the playback head playing back the track of the tape storing said reference frequency signals.

5. A space flying vehicle data recording and delayed transmitting system as set forth in claim 4 wherein said motive means drives said capstan and said commutator through a gear train, and said motive means is a direct current motor.

6. A space flying vehicle data recording and delayed transmitting system as set forth in claim 5 wherein said carrier frequency oscillator is a five thousand cycle oscillator.

7. A space flying vehicle data recording and delayed transmitting system as set forth in claim 6 wherein said high frequency bias oscillator is a sixty-seven thousand cycle oscillator.

References Cited

UNITED STATES PATENTS

| | | | |
|---|---|---|---|
| 2,753,546 | 7/1956 | Knowles | 340—183 |
| 3,084,011 | 4/1963 | Palic | 179—100.2 |
| 3,176,280 | 3/1965 | Fisher | 340—174.1 |
| 3,196,421 | 7/1965 | Grace et al. | 340—174.1 |

JAMES W. MOFFITT, Primary Examiner

J. RUSSELL GOUDEAU, Assistant Examiner

U.S. Cl. X.R.

179—100.2; 325—15; 340—183, 189